R. J. DEARBORN.
PROCESS OF MAKING ASBESTOS CEMENT SHINGLES.
APPLICATION FILED SEPT. 28, 1915.

1,247,939.

Patented Nov. 27, 1917.
2 SHEETS—SHEET 1.

INVENTOR
Richard J. Dearborn
BY
E. W. Marshall
ATTORNEY

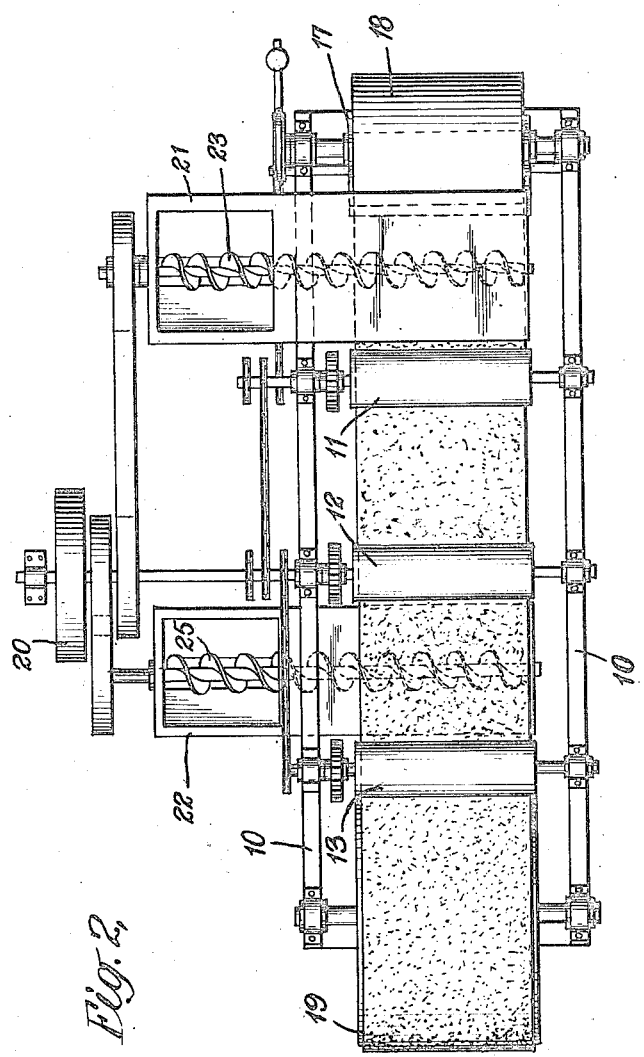

UNITED STATES PATENT OFFICE.

RICHARD J. DEARBORN, OF PLANDOME, NEW YORK, ASSIGNOR TO JOHN A. SCHARWATH, OF ELIZABETH, NEW JERSEY.

PROCESS OF MAKING ASBESTOS-CEMENT SHINGLES.

1,247,939.  Specification of Letters Patent.  Patented Nov. 27, 1917.

Application filed September 28, 1915. Serial No. 53,017.

*To all whom it may concern:*

Be it known that I, RICHARD J. DEARBORN, a citizen of the United States of America, and a resident of Plandome, Nassau county, and State of New York, have invented certain new and useful Improvements in Processes of Making Asbestos-Cement Shingles, of which the following is a specification, reference being had to the accompanying drawings, forming a part thereof.

My invention relates to the production of composition shingles, slabs, or the like, suitable for use for roofing and in the construction of buildings, and has special reference to the production of asbestos cement articles of this character.

One object of my invention is to provide a relatively simple and improved process for continuously producing a strip of composition material, embodying a reinforcing fabric and adapted to be cut into lengths of desired dimensions or into shingles, tiles, sheets, or the like.

Another object is to provide suitable apparatus for practising the aforesaid process.

Asbestos cement shingles, slabs and the like have hitherto been produced in various ways and have been largely utilized and it is my aim to provide an improved type of material and a process of producing composition articles that shall consist in a few simple steps and be adapted to be performed continuously by a suitable machine.

It has also been my aim to avoid the necessity for utilizing a paper-making apparatus including a screen, and means for taking the composition from the screen in the form of a layer of pulp.

One form of apparatus which is suitable for practising my process is shown in the accompanying drawings, the apparatus itself constituting a part of my invention.

Other objects and advantages of my invention will be set forth hereinafter, and in order that my invention may be thoroughly understood I will now proceed to describe the same in the following specification and then point out the novel features thereof in appended claims.

Referring to the drawings:

Fig. 2 is a plan view of a machine embodying my invention, and adapted for practising my improved process.

Figure 1:
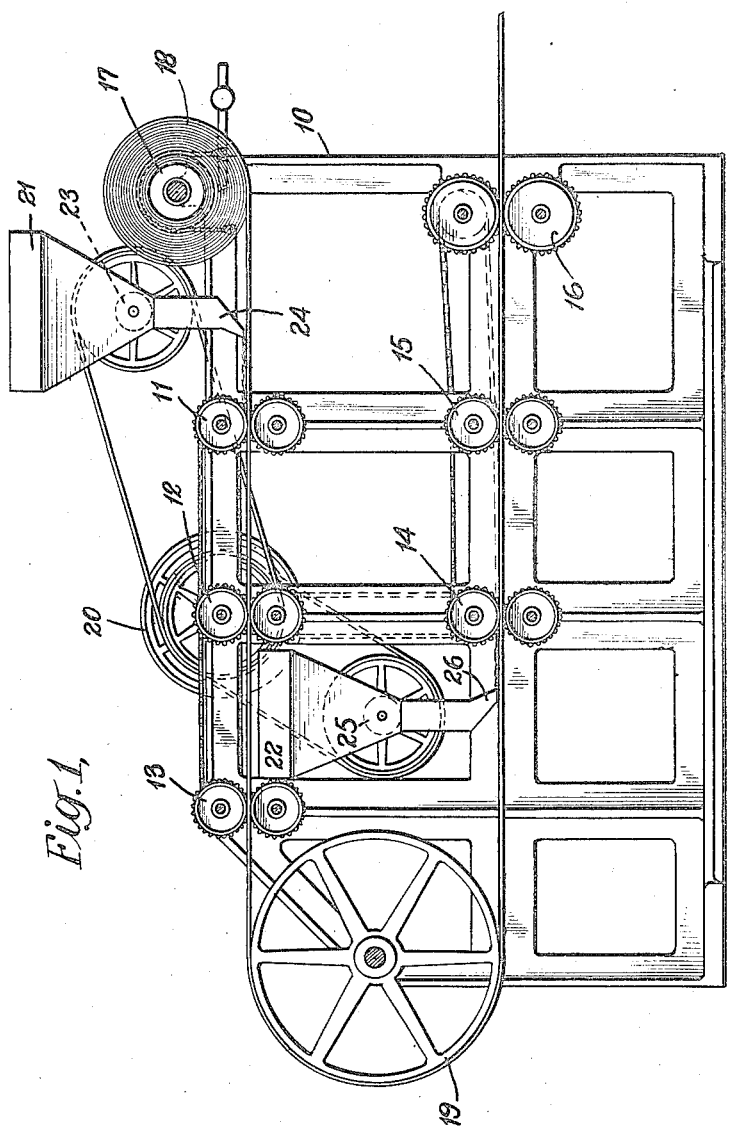
Figure 1 is an elevation.

According to my invention I utilize a web which is to constitute a reinforcement for the composition and constitute a part of the final product. The web is drawn from a supply roll and the composition material is flowed onto one side of it to form a layer and is run through pressure rolls to partially solidify the material into a strip which is next run over a sheave or pulley of relatively large diameter so that the positions of its surfaces are reversed. Finally, more composition is flowed onto the other side of the web which then passes through heavy pressure rolls to complete the product.

The web may be made of any suitable material such for example, as canvas, jute, metal or paper, and it may be preferably impregnated with water-proof material or otherwise treated to make it water-proof.

The result of this process is a slab of reinforced composition which is not only water-proof and hard, but is also particularly tough and practically indestructible. It is well adapted to be cut into tiles or shingles for roofing purposes, particularly when the reinforcing web is water-proof. For example, the shingles or tiles may become accidentally cracked from some cause, but the tile will not be destroyed because the parts will be held together by the reinforcement and if this reinforcement is water-proof the roof will not leak.

The reinforcing web is obviously embedded in the composition and is not at or near the surface where it would be subject to rapid deterioration. Furthermore, a single layer of reinforcement is sufficient, although, of course, more than one reinforcing layer may be employed within the spirit and scope of my invention.

The mixture may be composed of Portland or other hydraulic cement, and instead of asbestos which I consider preferable, some other fibrous binder, such as jute, may be used.

Having special reference to the drawings, the apparatus illustrated comprises a stationary frame 10 in which are mounted a plurality of initial pressure rolls arranged in pairs 11, 12 and 13, and a plurality of final pressure rolls arranged in pairs 14, 15 and 16. It also supports a shaft or bobbin 17 on which a roll 18 of reinforcing fabric is mounted. This bobbin is located in position to deliver fabric to the rolls 11, 12 and 13.

At the opposite end of the machine a sheave or pulley 19 is mounted in position to receive the web on which a composition layer has been deposited, as it leaves the group 13 of rollers. The arrangement of parts is such that the web is delivered from the opposite side of the pulley 19 directly to the rolls 14, 15 and 16.

The rolls are interconnected by suitable gearing as indicated in Fig. 2, and are driven by any suitable motive power which may be applied through a driving pulley 20, for example.

Obviously, the web of fabric as it is passed through the rolls 11, 12 and 13 around the sheave 19 and through the rolls 14, 15 and 16, presents a pair of horizontal surfaces and the machine comprises a pair of hoppers 21 and 22 which are adapted to receive a comparatively wet mixture of concrete and asbestos fiber or some other suitable composition depending upon the use to which the product is to be put. The material is discharged from the hopper 21 which is provided with a screw conveyer 23, through a nozzle 24 onto the web as it is stretched between the supply roll 18 and the pressure rolls 11. The material is carried in a thin layer on the web between the rolls 11, 12 and 13 successively. The composition is by this means somewhat hardened and adheres to the web as it now passes around the sheave or pulley 19. The opposite surface of the web is now uppermost and the hopper 22 which has a screw-conveyer 25 and a horizontal nozzle 26, discharges more composition, which is preferably in the form of a wet mixture, onto the web between the sheave 19 and the pressure rolls 14. The web passes successively through the rolls 14, 15 and 16, which, particularly the rollers 16, are adapted to exert a heavier pressure than the previous rolls and to complete the process of producing a solid composition web which is reinforced with the web of fabric and may be cut into any desired shapes and sizes.

It is obvious that the apparatus may be modified in various particulars within the spirit and scope of my invention and that other apparatus may be employed for practising my improved process. I therefore intend that only such limitations be imposed as are indicated in the appended claim.

What I claim is:

The process of producing cement shingles that consists in passing a reinforcing web with one surface uppermost, discharging a mixture of cement, water and asbestos thereon, applying pressure to the web after the layer of asbestos and cement is applied, passing the web with the layer of asbestos and cement in a reverse position, discharging more asbestos and cement mixture onto the opposite side of the web, and applying relatively high continuous pressure to the web after the second layer of mixture has been applied.

In witness whereof, I have hereunto set my hand this 27th day of September, 1915.

RICHARD J. DEARBORN.